No. 799,978. PATENTED SEPT. 19, 1905.
J. E. ERICKSON.
JOURNAL BOX.
APPLICATION FILED APR. 14, 1905.
2 SHEETS—SHEET 2.
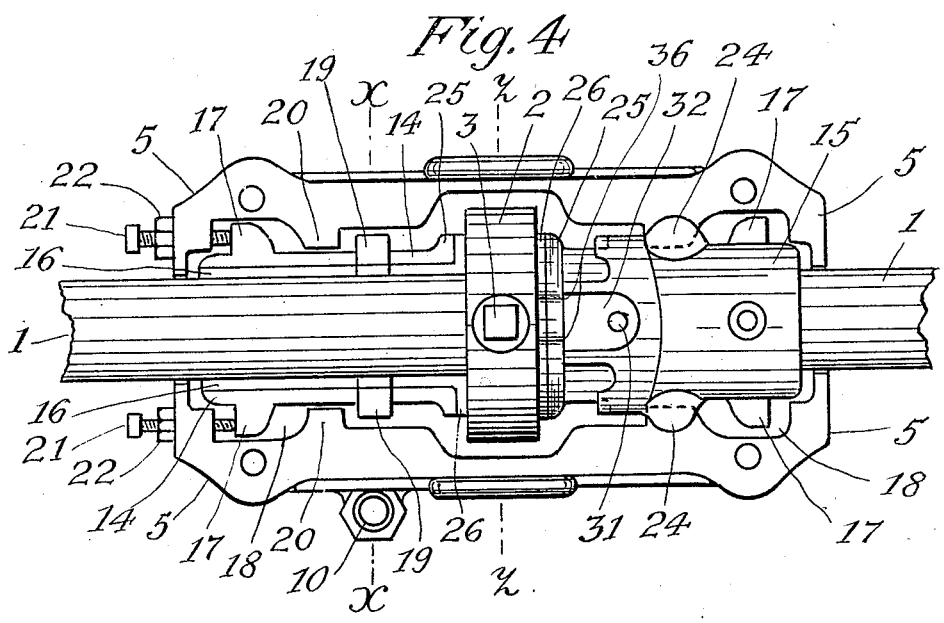
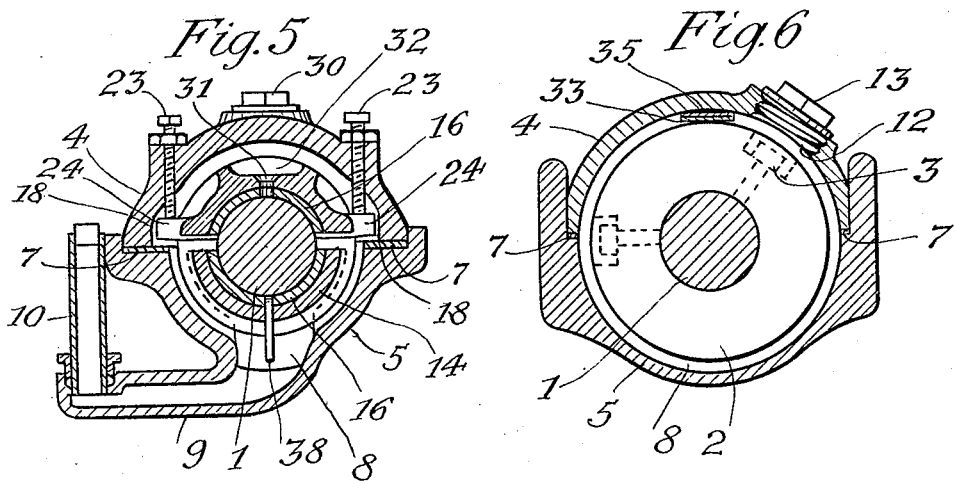
Witnesses
H. A. Bowman.
A. C. Taintor.
Inventor
John E. Erickson.
By P. V. Funckel
his Attorney.

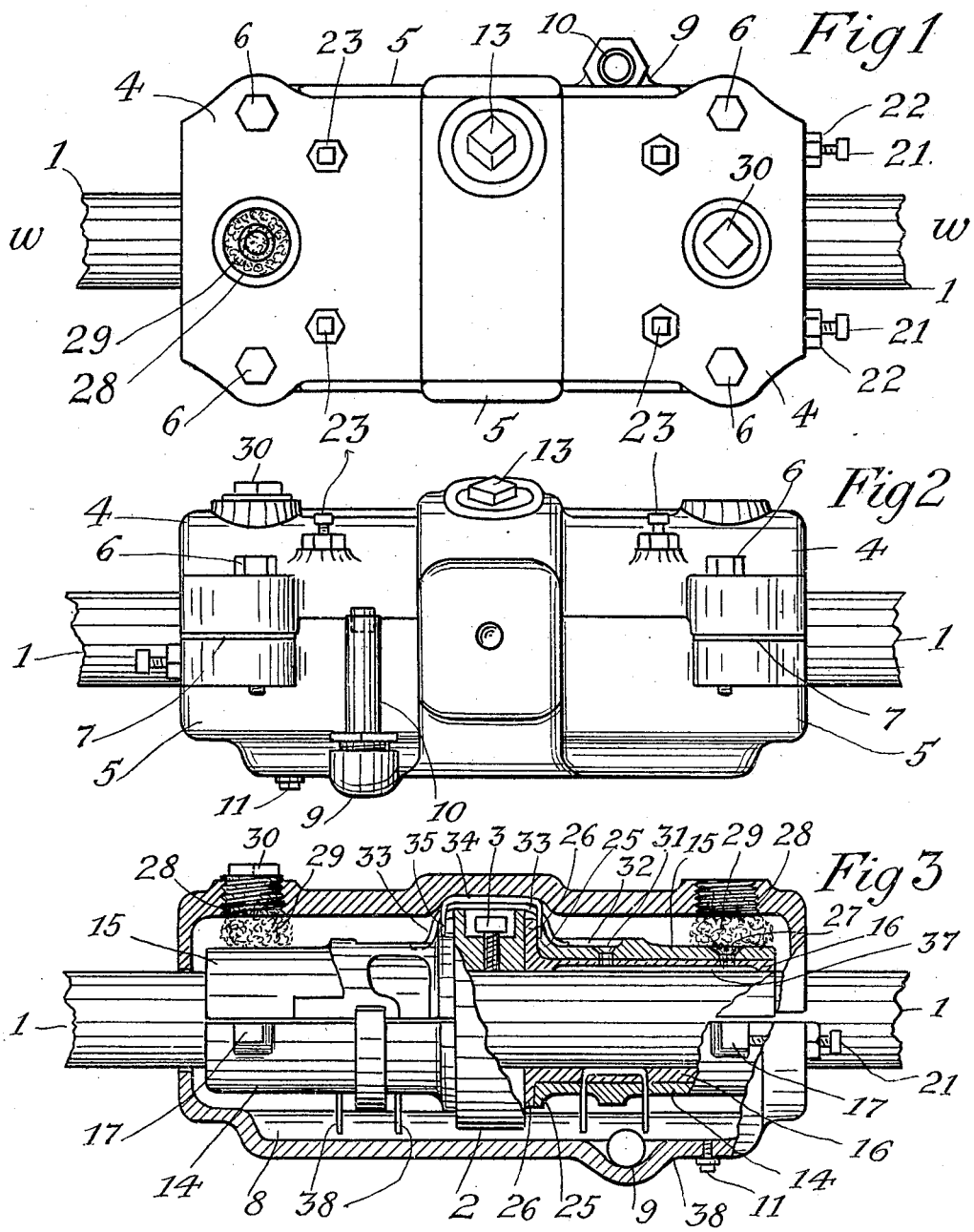

UNITED STATES PATENT OFFICE.

JOHN E. ERICKSON, OF ST. PAUL, MINNESOTA.

JOURNAL-BOX.

No. 799,978.      Specification of Letters Patent.      Patented Sept. 19, 1905.

Application filed April 14, 1905. Serial No. 255,508.

*To all whom it may concern:*

Be it known that I, JOHN E. ERICKSON, a citizen of the United States, residing at St. Paul, in the county of Ramsey and State of Minnesota, have invented certain new and useful Improvements in Journal-Boxes, of which the following is a specification.

My invention relates to boxes or bearings for shafting, and especially to shaft-hangers; and its objects are improvement of the construction with a view chiefly to obtaining better lubrication of the bearings, while effecting a saving of oil and facilitating the placing and renewing of the brasses or antifriction metal.

Stated in a general way, my improved devices comprise a pair of separate metal pieces lined with Babbitt metal or equivalent material placed at opposite sides of a collar on the shaft and held in place within a two-part shell, an oil-chamber in which the collar rotates, and means for properly distributing the oil. Such devices are illustrated in the accompanying drawings, in which—

Figure 1 is a top view of the journal-box and a portion of a shaft. Fig. 2 is a side or front view of the same. Fig. 3 is a vertical longitudinal section on the line $w\ w$ of Fig. 1. Fig. 4 is a plan view, the cover and the upper brass at the left of the collar having been removed to show the interior construction; and Figs. 5 and 6 are cross-sections on the lines $x\ x$ and $z\ z$, respectively, of Fig. 4.

In the drawings, 1 designates a shaft, and 2 a collar secured on the shaft by set-screws 3. The hanger or shell, which may be suspended or supported in any convenient way, comprises upper and lower members 4 and 5, respectively, secured together by bolts 6, a suitable packing 7 being interposed to prevent the leakage of oil at the joint. An oil-chamber 8 is provided in the lower portion of the member 5. A lateral hollow extension 9 in communication with the oil-chamber and provided with an upright glass tube 10 enables the level of the oil to be seen from without. Oil can be introduced to the chamber through the tube 10 and duct 9 or through the openings in the shell and bearings hereinafter described. A hole in the bottom of the chamber 8, closed by a screw-plug 11, permits the oil to be discharged when desired. Access to the set-screws 3 is had through an opening 12 in the shell member 4 for adjusting the collar on the shaft, and the opening is closed by a screw-plug 13.

Within the lower half-shell 5, at each side of the collar 2, is a pillow 14 and a cap 15, lined with Babbitt metal 16 or other suitable antifriction material, to provide proper bearings for the shaft. The pillows or bases 14 have lugs 17 at their sides, which extend into recesses 18 in the walls of the shell 5 to prevent the pillows from turning, and they also have projecting annular ribs 19, the outer sides of which are adjacent to corresponding ribs 20, formed on the inner walls of the shell to limit outward movement. At one end are screws 21, provided with lock-nuts 22 for adjusting the pillow at that end with respect to the position of the collar 2.

The ribs 19 project above the upper surfaces of the bases 14 into corresponding sockets formed in the lower edges of the caps, and the latter are thereby held from lateral movement on the bases. The caps are held down on the bases by screws 23, inserted from the top of the shell 4 and bearing on lateral lugs 24, formed on the sides of the caps. On the inner ends of the pillows and caps are rims 25, having facings 26, which are continuations of the brasses 16.

The caps have holes 27 beneath openings 28 in the shell, which are filled with cotton-waste 29 or like material, and the pockets are closed at the top by screw-plugs 30. Near the collar 2 the caps have oil-holes 31 leading to the shaft from depressions or reservoirs 32 in their upper surfaces. On the top of the collar is placed a strip 33 of felt or other fabric, which extends across the collar with its ends in the depressions 32, for the purpose of wiping the oil from the collar and conducting it into the reservoirs 32. The strip is held in place by a metal clasp 34, having downward catches 35, which engage in notches 36 in the rims 25 and prevent the wiping device from being carried around by the collar rotations. Narrow channels 37 are cut along the inner surfaces of the brasses from the oil-holes 31 to the holes 27 for the flow of oil along the upper surface of the shaft.

The pillows 14 and the brasses 16 they support have suitable openings through which wicks 38 or like devices extend to the underlying oil-chamber 8 for conducting oil by capillary attraction to the under surface of the shaft.

The two pillows or bases 14 are alike in construction and are interchangeable, and the same is true of the two caps 15. When any of these parts have become so much worn as to require renewing, they can be readily removed and others substituted for them. The Babbitt metal or other antifriction metal can be readily taken from the removed pillows or caps and renewed for future service. In use the devices have proved very durable and economical and the lubrication of the bearings has been entirely satisfactory.

Having described my invention, what I claim, and desire to secure by Letters Patent, is—

1. A journal-box, comprising upper and lower shell members, the latter providing an oil-chamber, and a pair of independent adjustable pillows and their caps within such shell; in combination with a shaft and an adjustable collar thereon intermediate the pair of pillows and their caps, substantially as set forth.

2. A journal-box, comprising upper and lower shell members, the latter providing an oil-chamber, and a pair of independent adjustable pillows and their caps within such shell, the pillows and caps having linings of antifriction metal; in combination with a shaft and an adjustable collar thereon intermediate the pair of pillows and their caps, substantially as set forth.

3. A journal-box comprising upper and lower shell members, the latter providing an oil-chamber, and a pair of independent pillows and their caps adjustable longitudinally within such shell; in combination with a shaft and an adjustable collar thereon intermediate the pair of pillows and their caps, substantially as set forth.

4. A journal-box, comprising upper and lower shell members, the latter providing an oil-chamber, and a pair of independent pillows and their caps adjustable longitudinally within such shell, the pillows and caps having linings of antifriction metal; in combination with a shaft and an adjustable collar thereon intermediate the pair of pillows and their caps, substantially as set forth.

5. A journal-box, comprising upper and lower shell members, the latter providing an oil-chamber, and a pair of independent pillows and their caps adjustable longitudinally within such shell, the pillows and caps having linings of antifriction metal; in combination with a shaft and an adjustable collar thereon intermediate the pair of pillows and their caps, and means for conducting oil from the top of the collar through openings in the caps to the shaft, substantially as set forth.

6. A journal-box, comprising upper and lower shell members, the latter providing an oil-chamber, and a pair of independent pillows and their caps adjustable longitudinally within such shell, and means for adjusting the positions of the pillows and their caps within the shell; in combination with a shaft and an adjustable collar thereon intermediate the pair of pillows and their caps, substantially as set forth.

7. A journal-box, comprising upper and lower shell members, the latter providing an oil-chamber, and a pair of independent pillows and their caps adjustable longitudinally within such shell, means for adjusting the positions of the pillows and their caps, and means for holding them in place within the shell; in combination with a shaft and an adjustable collar thereon intermediate the pair of pillows and their caps, substantially as set forth.

8. A journal-box, comprising upper and lower shell members, the latter providing an oil-chamber, and a pair of independent pillows and their caps adjustable longitudinally within such shell, the pillows and caps having linings of antifriction metal; in combination with a shaft and an adjustable collar thereon intermediate the pair of pillows and their caps, and a wiper arranged to wipe the oil from the top of the collar and conduct it to openings in the caps, substantially as set forth.

9. A journal-box, comprising upper and lower shell members, the latter providing an oil-chamber, and a pair of independent pillows and their caps adjustable longitudinally within such shell, the pillows and caps having rims on their inner ends and linings of antifriction metal for contact with a shaft and collar, in combination with a shaft and an adjustable collar, substantially as set forth.

10. A journal-box, comprising upper and lower shell members, the latter providing an oil-chamber, and a pair of independent pillows and their caps adjustable longitudinally within such shell, the pillows and caps having linings of antifriction metal; in combination with a shaft and an adjustable collar thereon intermediate the pair of pillows and their caps, and a wiper arranged to wipe and conduct the oil from the collar, the caps being provided with reservoirs and ducts for receiving and feeding the oil to the shaft, substantially as set forth.

11. A journal-box, comprising upper and lower shell members, the latter providing an oil-chamber, and a pair of independent pillows and their caps adjustable longitudinally within such shell, means for adjusting the positions of the pillows and their caps, and means for holding them in place within the shell while permitting them to adjust themselves laterally within the shell; in combination with a shaft and an adjustable collar thereon intermediate the pair of pillows and their caps, substantially as set forth.

In testimony whereof I have signed my name to this specification, in the presence of two subscribing witnesses, this 3d day of April, 1905.

JOHN E. ERICKSON.

Witnesses:
  P. H. GUNCKEL,
  H. A. BOWMAN.